United States Patent
Schüth et al.

(10) Patent No.: US 9,755,248 B2
(45) Date of Patent: Sep. 5, 2017

(54) USE OF MESOPOROUS GRAPHITE PARTICLES FOR ELECTROCHEMICAL APPLICATIONS

(71) Applicant: STUDIENGESELLSCHAFT KOHLE MBH, Mülheim an der Ruhr (DE)

(72) Inventors: Ferdi Schüth, Mülheim an der Ruhr (DE); Diana Carolina Galeano Nunez, Mülheim an der Ruhr (DE); Hans-Josef Bongard, Mülheim an der Ruhr (DE); Stefano Mezzavilla, Mülheim an der Ruhr (DE); Karl J. Mayrhofer, Düsseldorf (DE); Josef C. Meier, Düsseldorf (DE); Claudio Baldizzone, Düsseldorf (DE); Jean-Francois Drillet, Mannheim (DE); Sakthivel Mariappan, Frankfurt am Main (DE); Tadios Tesfu, Frankfurt am Main (DE); Volker Peinecke, Mülheim an der Ruhr (DE)

(73) Assignee: STUDIENGESELLSCHAFT KOHLE MBH, Mülheim an der Ruhr (DE)

( * ) Notice: Subject to any disclaimer, the term of this patent is extended or adjusted under 35 U.S.C. 154(b) by 0 days.

(21) Appl. No.: 14/375,602

(22) PCT Filed: Feb. 8, 2013

(86) PCT No.: PCT/DE2013/100046
§ 371 (c)(1),
(2) Date: Jul. 30, 2014

(87) PCT Pub. No.: WO2013/117192
PCT Pub. Date: Aug. 15, 2013

(65) Prior Publication Data
US 2015/0017555 A1  Jan. 15, 2015

(30) Foreign Application Priority Data

Feb. 8, 2012 (EP) ..................................... 12154508
Mar. 13, 2012 (DE) ........................ 10 2012 102 120

(51) Int. Cl.
| | |
|---|---|
| *H01M 4/133* | (2010.01) |
| *H01M 4/92* | (2006.01) |
| *B01J 37/08* | (2006.01) |
| *B01J 37/18* | (2006.01) |
| *B01J 21/18* | (2006.01) |
| *B01J 23/40* | (2006.01) |
| *B01J 23/42* | (2006.01) |
| *B01J 23/745* | (2006.01) |
| *B01J 35/10* | (2006.01) |
| *B01J 37/02* | (2006.01) |
| *B01J 37/34* | (2006.01) |
| *B01J 23/06* | (2006.01) |
| *B01J 23/08* | (2006.01) |
| *B01J 23/14* | (2006.01) |

(Continued)

(52) U.S. Cl.
CPC ............. *H01M 4/926* (2013.01); *B01J 21/18* (2013.01); *B01J 23/06* (2013.01); *B01J 23/08* (2013.01); *B01J 23/14* (2013.01); *B01J 23/16* (2013.01); *B01J 23/40* (2013.01); *B01J 23/42* (2013.01); *B01J 23/44* (2013.01); *B01J 23/48* (2013.01); *B01J 23/50* (2013.01); *B01J 23/52* (2013.01); *B01J 23/626* (2013.01); *B01J 23/6525* (2013.01); *B01J 23/6562* (2013.01); *B01J 23/70* (2013.01); *B01J 23/745* (2013.01); *B01J 23/892* (2013.01); *B01J 23/8906* (2013.01); *B01J 23/8913* (2013.01); *B01J 23/8926* (2013.01); *B01J 23/8966* (2013.01); *B01J 35/002* (2013.01); *B01J 35/006* (2013.01); *B01J 35/008* (2013.01); *B01J 35/0033* (2013.01); *B01J 35/0046* (2013.01); *B01J 35/0086* (2013.01); *B01J 35/08* (2013.01); *B01J 35/1028* (2013.01); *B01J 35/1061* (2013.01); *B01J 37/0203* (2013.01); *B01J 37/0244* (2013.01); *B01J 37/084* (2013.01); *B01J 37/18* (2013.01); *B01J 37/343* (2013.01); *C01B 31/04* (2013.01); *H01M 4/8605* (2013.01); *H01M 4/8842* (2013.01); *H01M 4/8882* (2013.01); *H01M 4/9041* (2013.01); *H01M 4/9083* (2013.01); *H01M 8/1018* (2013.01); *H01M 12/04* (2013.01); *H01M 12/08* (2013.01); *B01J 29/0325* (2013.01); *B01J 35/0006* (2013.01); *C01P 2004/32* (2013.01); *C01P 2006/12* (2013.01); *H01M 2008/1095* (2013.01); *H01M 2300/0082* (2013.01)

(58) Field of Classification Search
CPC .............................. H01M 4/133; H01M 4/134
See application file for complete search history.

(56) References Cited

U.S. PATENT DOCUMENTS

| | | | |
|---|---|---|---|
| 2006/0166811 A1 | 7/2006 | Huang et al. | |
| 2006/0263288 A1* | 11/2006 | Pak .......................... | B01J 21/18 423/445 R |

FOREIGN PATENT DOCUMENTS

EP   2 626 131 A1   8/2013

OTHER PUBLICATIONS

Fang et al. (J. Phys. Chem. C 2008, 112, 639-645).*

* cited by examiner

*Primary Examiner* — Olatunji Godo
(74) *Attorney, Agent, or Firm* — Norris McLaughlin & Marcus, P.A.

(57) ABSTRACT

The present invention relates to the use of mesoporous graphitic particles having a loading of sintering-stable metal nanoparticles for fuel cells and further electrochemical (Continued)

applications, for example as constituent of layers in electrodes of fuel cells and batteries.

9 Claims, No Drawings

(51) Int. Cl.
    *B01J 23/16*           (2006.01)
    *B01J 23/44*           (2006.01)
    *B01J 23/48*           (2006.01)
    *B01J 23/50*           (2006.01)
    *B01J 23/52*           (2006.01)
    *B01J 23/62*           (2006.01)
    *B01J 23/652*          (2006.01)
    *B01J 23/656*          (2006.01)
    *B01J 23/70*           (2006.01)
    *B01J 23/89*           (2006.01)
    *B01J 35/08*           (2006.01)
    *C01B 31/04*          (2006.01)
    *H01M 4/90*          (2006.01)
    *H01M 12/04*          (2006.01)
    *H01M 12/08*          (2006.01)
    *H01M 4/86*          (2006.01)
    *H01M 4/88*          (2006.01)
    *B01J 35/00*          (2006.01)
    *B01J 29/03*          (2006.01)
    *H01M 8/1018*        (2016.01)

USE OF MESOPOROUS GRAPHITE PARTICLES FOR ELECTROCHEMICAL APPLICATIONS

This application is a 371 of International Patent Application No. PCT/DE2013/100046, filed Feb. 8, 2013, which claims benefit of German Patent Application No. 10 2012 102 120.1, filed Mar. 13, 2012, and of European Patent Application No. 12154508.1, filed Feb. 8, 2012, the disclosures of which are incorporated herein by reference.

The present invention relates to the use of mesoporous graphitic particles having a loading of sintering-stabile metal nanoparticles for fuel cells and further electrochemical applications, for example as constituent of electrochemically active and passive layers in electrodes of batteries, PEM fuel cells or of electrochemical elements and electrochemical energy transformers.

The mesoporous graphitic particles in the context of the present invention and the production thereof are described in the European patent application having the application number 2012/154508 of Feb. 8, 2012, and the priority of that application is claimed here.

As described there, the mesoporous graphitic particles are loaded with sintering-stable metal nanoparticles and are obtainable via a process in which
  particles having a mesoporous base framework are impregnated with a graphitizable/carbonizable organic compound, preferably in solution,
  the particles obtained in this way are subjected to a high-temperature graphitization step in order to form a graphitic framework in the porous base framework,
  the graphitized particles obtained in this way are subjected to a process for removing the base framework and thereby obtain a mesoporous graphitic framework, known as n-HGS (hollow graphitic spheres) particles,
  the mesoporous graphitic particles (n-HGS particles) obtained in this way are impregnated with a solution of a catalytically active metal salt of, for example, Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y and mixtures thereof,
  the graphitic mesoporous particles obtained in this way are subjected to a hydrogenation step in order to obtain the catalytically active metal particles on and/or in the pores of the mesoporous particles.

In this process, the metal salts are reduced to the metals, which can occur either chemically in the presence of hydrogen or thermally at elevated temperature.

This is followed, in the production process, by a further step in which the graphitic mesoporous particles having the metal loading obtained in this way are calcined in a temperature range of preferably from 600° C. to 1000° C. in order, in particular, to stabilize the particles and the catalytically active metals.

When loading of the particles with metals is not carried out, the n-HGS particles obtained in the intermediate step as hollow graphitic spheres are likewise suitable for electrochemical applications in which the porosity, the mechanical and electrochemical stability and electrical conductivity of the spherical shells can be exploited.

The particles having a porous base framework which can be used in the process of the invention can have a solid core and a porous shell or a porous structure in the entire particle, so that removal of the base framework and graphitization of the organic compound results in formation of particles having a hollow core and a porous shell or a particle having a porous structure throughout.

The particles used here generally have mesopores having a size of from 2 to 50 nm in which the graphitic network is formed in the graphitization step. It is possible here for core and porous shell to be composed of different materials. For example, the core can be a polymeric organic or inorganic material which is surrounded by a porous layer of an inorganic material such as silica, zirconium dioxide, titania or hydrated precursors.

The graphitizable/carbonizable organic compound which can be used is not particularly restricted to particular groups of materials, as long as the graphitization process, which is usually carried out at elevated temperatures of more than 600° C. in an oxygen-free atmosphere, leads to a graphitic network structure within the porous base framework of the particle, and can be a polymerizable hydrocarbon monomer such as a vinyl compound such as vinylbenzene or a combination of at least two organic, resin-forming compounds such as resorcinol/formaldehyde, mesophase pitch or other monomers of polymers which give a high carbon yield in the carbonization process.

The hollow graphitic spheres (HGS) which are particularly advantageous for the purposes of the invention can advantageously be produced by "nanocasting" of silica particles having a solid core and a mesoporous shell. These silica particles can be produced by reacting at least one hydrolyzable silicon compound in the presence of at least one pore-forming agent such as a hydrocarbon-silicon compound in order to form particles having an $SiO_2$ precursor framework, drying and calcining the particles obtained in this way in order to obtain the desired silica particles having a mesoporous shell. The hydrolyzable silicon compound here is preferably a siloxane compound such as tetraalkoxysilane which can be hydrolyzed to an $SiO_2$ precursor framework, with this framework optionally having hydroxyl groups which can be converted into Si—O—Si bonds during calcination.

This hydrolysis can be commenced before addition of the hydrocarbon-silicon compound in order to obtain an $SiO_2$ precursor base framework which can then be reacted in the presence of the hydrocarbon-silicon compound in order to obtain the $SiO_2$ precursor base framework. This hydrocarbon-silicon compound is used for the purpose of producing nanopores during the subsequent calcination step and is generally a silicon compound having at least one long-chain $C_{10}$-$C_{30}$-alkyl group which is bound to silicon. Such particles having a solid $SiO_2$ core and a mesoporous shell around the core generally have a diameter of from 100 nm to 600 nm, with the shell having a thickness of from 20 nm to 80 nm. Accordingly, the solid $SiO_2$ core can have a diameter in the range from 60 nm to 450 nm. Preference is given to the diameter of the solid core being in the range from 200 nm to 400 nm and the thickness of the shell around the core being from 20 nm to 50 nm.

The mesoporous silicon dioxide particles obtained in this way are treated with a solution of a metal salt as graphitization catalyst, with the total pore volume of the mesoporous shell of the particles preferably being impregnated with a metal salt as graphitization catalyst, where the metal salt is generally matched to the monomer which is used for filling the mesopores in the next step. For some applications, it is necessary for the metal salt, in particular in the case of Fe salts as "degradation catalyst" for degradation of the polymer in the later use in the electrochemical application to be made completely inert or subsequently to be washed out completely.

The hollow graphitic spheres having a hollow core and a mesoporous shell which can be obtained by the process generally have a diameter in the range from 60 nm to 440 nm, or up to 560 nm, and the layer thickness of the shell is generally from 20 nm to 50 nm. The HGS particles generally have a bimodal pore size distribution determined by the BJH method with the main distribution in the range from 2 to 6 nm, preferably from 3 to 4 nm, and the second pore size distribution in the range from 6 to 20 nm, in particular from 8 to 12 nm.

The HGS particles obtained in this way display the properties of an increased thermal stability from 600° C. to 700° C., with 40% of the graphitic domains being thermally stable even up to 800° C. The BET surface area is greater than 1000 $m^2$ per gram, in particular more than 1400 $m^2$ per gram, and the residual metal content is less than 0.5% by weight; the residual content is preferably decreased so far (either ppm range or by "complete encapsulation") so that this metal or the salt thereof can no longer display any catalytic effects.

These n-HGS particles can then be treated with a solution of a metal salt of a catalytically active metal such as Ti, V, Cr, Mn, Fe, Co, Ni, Cu, Zn, Al, Mo, Se, Sn, Pt, Ru, Pd, Au, Ag, W, Ir, Os, Rh, Nb, Ta, Pb, Bi, Y, Sc, Au, Ag, Sc, Y, mixtures or combinations thereof as described above, preferably by means of an impregnation step, with, as mentioned above, the volume of the preferably alcoholic solution of the metal salts being absorbed completely into the pores of the HGS particles, in order to form the precursor M-HGS particles. In the next step, after drying or after evaporation of the solvent, the precursor M-HGS particles obtained in this way are subjected to a hydrogenation step using hydrogen at an elevated temperature in the range from 200° C. to 400° C. over a period of up to 10 hours in order to obtain the metal-HGS particles (M-HGS) and to remove volatile reaction products of the metal salts, e.g. hydrogen halide.

The metal nanoparticles are homogeneously distributed in high concentration over the surface within the pore system of the M-HGS particles, and the defined mesoporosity with pores having a size of from 2 to 6 nm and the large surface area of the graphitic shells not only allow the formation of the metallic nanoparticles in the pore system but likewise lead to a high loading of the metal nanoparticles having a uniform size distribution and a high stability in respect of coalescence. The metal loading is preferably in the range from 10% by weight to 40% by weight, sometimes also from 5% by weight up to 50% by weight, based on the total weight of HGS particles.

A treatment in which the metal-HGS particles are calcined in the temperature range from 600° to 1000° C. for a period of up to a number of hours in order to increase the stability of the metal nanoparticles advantageously follows.

The mesoporous graphitic particles having a loading of metal nanoparticles, hereinafter also referred to as M-HGS particles, ultimately obtained in this way have, particularly in the pores of the mesoporous shell structure, a large active surface area, a low initial potential ("oxygen reduction onset potential") for the reduction of oxygen and a limiting power density comparable to the metal-loaded Vulkan particles known from the prior art (commercial electrocatalysts).

These properties make the material which can be produced in this way in accordance with the abovementioned EP 12154508 particularly suitable for use in electrochemical applications. Particularly in the case of fuel cells, both the oxidation of hydrogen and of small organic fuel molecules, e.g. $NH_3$, $N_2H_4$, at the anode and also the reduction of oxygen at the cathode make effective electrocatalysis necessary in order to obtain power densities and voltages which are required for practical applications. For this use in fuel cells, the following properties, in particular, of the M-HGS materials are advantageous:

The large specific surface area leads to an increased capacity for the uptake of reactants and also to many anchor places for the catalyst particles to be deposited . . . ).

The small pores within the shell layer increase the stability of the catalyst particles by "capture/fixing" of these.

The materials have a good electrical conductivity, a good thermal conductivity for transporting away waste heat and excellent corrosion resistances.

Owing to the porosity, efficient water and oxygen transport and transport of further fluid materials such as water, water vapor, ammonia, methanol and also protons ($H^+$) and, for other applications, also hydroxide ions ($OH^-$) into and through the particles is possible.

The surface structure allows good wettability of the particle surfaces with the electrolyte within the catalyst layer of an electrode, which in turn allows good accessibility of the catalytically active spots within the particle shell layer.

The mechanical stability of the materials allows good processability, including during pressing of the membrane-electrode assembly comprising anode, membrane and cathode.

Owing to the narrow particle size distribution, it is possible to achieve more homogeneous layer structures than in the case of standard materials such as the electrocatalysts based on commercially available Vulcan XC72, with the HGS layer structures being regular and allowing better definition of the layer structures. This leads to improved processability as a result of quicker production of homogeneous layers under cheaper conditions. Owing to the porous shell structure, the catalytically active spots in the pores are more accessible, which leads, for example, on the cathode side to improved supply of protons ($H^+$) and oxygen ($O_2$) to the catalyst particles or to better catalyst utilization, so that thinner layers are also possible at a reduced amount of active metal for the same performance. This makes cost savings due to reduced noble metal consumption possible.

In addition, the structure of the particles having a hollow core and a porous shell makes it possible to improve the mass transfer in the catalyst layer which usually contains, as 3 phases, the empty volume (P1: gas and water transport), HGS-based catalyst particles (P2: electric power and heat transport and also catalytic activity) and membrane polymer (P3: proton transport). Gas and liquid can diffuse not only through the "intesticies between the spheres" but additionally through the interior of the spheres and thus overall better and be transported to/from the reaction sites.

Electron transport from sphere to sphere can occur via the sphere shell, while gas transport can occur internally through the porous shells and the hollow spaces from sphere to adjacent sphere. The ion or charge transport can in this case occur in the polymer network surrounding the spheres, thus making it possible in the case of "close packing of spheres", unlike the case of the "solid" standard materials, for complete flooding or filling of the intesticies between the spheres with polymer network to occur, which leads to an increase in the ionic conductivity and the mechanical stability of the catalyst layer. Ultimately, improved supply of ions to the catalyst particles (resulting in better catalyst utilization) and thus an increase in the performance of the catalyst layer results therefrom.

At the same time, when HGS particles (n-HGS) which have not been coated with catalyst metal are used, an improvement in the gas diffusion into and through the catalytically inactive intermediate layer which is usually present in the gas diffusion electrode (GDE) of a fuel cell, also referred to as microporous layer (MPL), is made easier and standard MPL structures having PTFE as binder can be used here. The porosity or permeability of the shell of n-HGS particles also allows the hollow space of the sphere to be coated on the inside with "liquid Teflon" (THV or similar, soluble PTFE-like polymers), which leads to an improvement in water transport through the particles. If a coating or a binder having hydrophobic properties is appropriately selected, the use in the MPLs of only an additive which, both in the interior of the spheres and also outside around them, can serve as agent for hydrophobicizing the surface, is therefore possible.

The inventors have discovered that the use according to the invention of the M-HGS particles leads to a higher power even from thicker catalyst layers ($d_{CL}$>50 µm), which is not possible using the material known from the prior art. Correspondingly, it is possible to reduce the thickness of the catalyst layer and consequently the amount of catalyst at a power which remains the same compared to the prior art.

Owing to the size of the M-HGS particles and the performance even of relatively thick catalyst layers, it is possible, when the polymer network is appropriately selected, to leave out the MPL on the gas diffusion layer (GDL) and apply the catalyst layer in the polymer network directly to the GDL in order to produce a GDE which consists of only two instead of the usual three sublayers. Here, the pores which are close to the surface of the GDL and face the catalyst layer can be partially filled by the catalyst layer itself, and firm adhesion of the catalyst layer to the GDL can be achieved in this way.

Low temperature or intermediate-temperature polymer electrolyte membrane fuel cells (LT- and IT-PEMFC) and high-temperature variants containing phosphoric acid (HT-PEMFC), the HGS particles can likewise be used according to the invention as anode or as cathode in direct methanol fuel cells (DMFC), which compared to the material known in the prior art leads to improved transport of oxygen, water and also of methanol and carbon dioxide (anode-side product) and at the same time gives improved corrosion resistance.

The materials according to the invention can likewise be used in electrolysis for the cathode ($H_2$ side) or in an electrochemical methanol reformer for the cathode ($H_2$ side) or for anode (methanol side) and cathode ($H_2$ side).

The n-HGS particles according to the invention are in principle also suitable as constituents of lithium ion batteries and lithium-sulfur batteries, especially of the electrodes. The smaller particle diameter and the high electrical conductivity firstly makes it possible for them to be used as conductivity additive, and the particles can also be used as constituents of the coating on anode or cathode. Especially in the case of lithium ion batteries, silicon-based anodes are being used in the research stage; owing to the high theoretical capacity of silicon of 4000 mAh/g, these are subject of intensive research. However, owing to the volume expansion of silicon on incorporation of the lithium atoms in the crystal lattice, mechanical stresses occur and these destroy the Si crystallites. When M-HGS particles or Si-HGS particles having silicon crystallites present in the hollow core are used, lithium battery anodes which have increased cycling stability compared to the Si composites in anodes known from the prior art are possible.

Furthermore, the use of both the n-HGS particles and the M-HGS particles for metal-air batteries or metal-air fuel cells both in primary cells and secondary cells is possible according to the invention. Here, the HGS particles can be used to increase the catalytic activity or mass transfer in the air electrode.

It can be seen from all the above that the HGS particles can be used according to the invention for many applications in the field of electrochemistry or electrochemical energy transformers. This use is made possible, in particular, by the properties of the HGS materials in respect of the high specific surface area, hollow nature and porosity (sphere interior, sphere shell), good electrical conductivity, good thermal conductivity, excellent corrosion resistance and good wettability. Furthermore, the pseudo-monodispersity at an average sphere diameter which can be set and a narrow particle size distribution is advantageous. In addition, an increased mechanical strength resulting from the configuration of the particles as hollow spheres is advantageous, especially during application of layers and pressing operations, since the particles do not break up under a mechanical load.

The invention claimed is:

1. A process comprising conducting an electrochemical reaction in the presence of a catalyst, said catalyst comprising mesoporous graphitic particles having a loading of sintering-stable metal nanoparticles (M-HGS) in an interconnected 3D mesopore structure, wherein the mesoporous graphitic particles having a loading of sintering-stable metal nanoparticles (M-HGS) in an interconnected 3D mesopore structure are obtainable by a process comprising:
   (a) impregnating particles having a mesoporous base framework with a graphitizable organic compound to yield impregnated particles;
   (b) subjecting the impregnated particles to a high-temperature graphitization step in order to yield graphitized particles having graphitic framework in the mesoporous base framework;
   (c) subjecting the graphitized particles to a process for removing the mesoporous base framework in order to yield mesoporous graphitic particles having a mesoporous graphitic framework;
   (d) impregnating the mesoporous graphitic particles with a solution of a salt of a catalytically active metal to yield impregnated mesoporous graphitic particles;
   (e) subjecting the impregnated mesoporous graphitic particles to a hydrogenation step in order to yield metal-loaded impregnated mesoporous graphitic particles having catalytically active metal particles in mesopores of the metal-loaded impregnated mesoporous graphitic particles; and
   (f) calcining the metal-loaded impregnated mesoporous graphitic particles in a temperature range of from 600° C. to 1000° C. in order to obtain said mesoporous graphitic particles having a loading of sintering-stable metal nanoparticles (M-HGS) in mesopores in an interconnected 3D mesopore structure;
   and wherein said mesoporous graphitic particles having a loading of sintering-stable metal nanoparticles (M-HGS) in an interconnected 3D mesopore structure comprise a hollow sphere structure comprising a mesoporous graphitic shell having a layer thickness of from 20 nm to 50 nm and a hollow core having a diameter of from 60 nm to 440 nm, and the mesoporous graphitic shell is loaded with the catalytically active metal, and the catalytically active metal is selected from among Ti, V, Cr, Mn, Fe, Co, Ni, Cu, Zn, Al, Mo, Se, Sn, Pt, Ru, Pd, W, Ir, Os, Rh, Nb, Ta, Pb, Bi, Au, Ag, Sc, Y, and combinations thereof in from 5-50% by weight based on the total weight of the mesoporous graphitic particles having a loading of sintering-stable metal nanoparticles (M-HGS) in mesopores in an interconnected 3D mesopore structure.

2. The process as claimed in claim 1, wherein the catalyst is a constituent of an electrode in an electrochemical cell.

3. The process as claimed in claim 2, wherein the catalyst is an oxidation catalyst anode constituent of an electrochemical cell.

4. The process as claimed in claim 2, wherein the catalyst is a reduction catalyst cathode of an electrochemical cell.

5. The process as claimed in claim 1, wherein the catalyst is a layer constituent in a layer structure of a membrane-electrode assembly (MEA) of a fuel cell, electrochemical cell, or electrochemical reformer or is a constituent of an electrode layer of a battery.

6. The process as claimed in claim 1, wherein the catalytically active metal is selected from Pt with at least one of Fe, Co, Ni, Cu, Ru, Pd, Au, Ag, Sn, Mo, Mn, Y, and Sc.

7. A process comprising conducting an electrochemical reaction in the presence of mesoporous graphitic particles without a loading of sintering-stable metal nanoparticles (n-HGS), wherein the mesoporous graphitic particles without a loading of sintering-stable metal nanoparticles (M-HGS) are obtainable by a process comprising:

(a) impregnating particles having a mesoporous base framework with a graphitizable organic compound to yield impregnated particles;

(b) subjecting the impregnated particles to a high-temperature graphitization step in order to yield graphitized particles having graphitic framework in the mesoporous base framework;

(c) subjecting the graphitized particles to a process for removing the mesoporous base framework in order to yield said mesoporous graphitic particles without a loading of sintering-stable metal nanoparticles (n-HGS);

and wherein said mesoporous graphitic particles without a loading of sintering-stable metal nanoparticles (n-HGS) comprise a hollow sphere structure comprising a mesoporous graphitic shell having a layer thickness of from 20 nm to 50 nm and a hollow core having a diameter of from 60 nm to 440 nm.

8. The process according to claim 7, wherein the electrochemical reaction occurs in a fuel cell, at an anode or at a cathode.

9. Process according to claim 1, wherein the metal-loaded impregnated mesoporous graphitic particles obtained in step e) have catalytically active metal sites on the metal-loaded impregnated mesoporous graphitic particles.

* * * * *